United States Patent
Holden et al.

(10) Patent No.: US 9,942,266 B2
(45) Date of Patent: *Apr. 10, 2018

(54) PREVENTING APPLICATION-LEVEL DENIAL-OF-SERVICE IN A MULTI-TENANT SYSTEM

(71) Applicant: International Business Machines Corporation, Armonk, NY (US)

(72) Inventors: Russell L. Holden, Boxborough, MA (US); John Douglas Curtis, Milford, MA (US); Peter Otto Mierswa, Sterling, MA (US)

(73) Assignee: International Business Machines Corporation, Armonk, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/829,197

(22) Filed: Aug. 18, 2015

(65) Prior Publication Data
US 2015/0358349 A1   Dec. 10, 2015

Related U.S. Application Data

(63) Continuation of application No. 14/148,305, filed on Jan. 6, 2014.

(51) Int. Cl.
*G06F 13/00* (2006.01)
*H04L 29/06* (2006.01)
(Continued)

(52) U.S. Cl.
CPC ........ *H04L 63/1458* (2013.01); *G06F 9/505* (2013.01); *G06F 17/30153* (2013.01);
(Continued)

(58) Field of Classification Search
CPC ............ H04L 29/06; H04L 29/0809; H04L 29/08072; H04L 63/08; H04L 63/102;
(Continued)

(56) References Cited

U.S. PATENT DOCUMENTS

| | | | |
|---|---|---|---|
| 8,468,244 B2 | 6/2013 | Redlich et al. | |
| 2011/0083179 A1* | 4/2011 | Lawson | H04L 63/1458 726/22 |
| 2013/0074181 A1 | 3/2013 | Singh | |

OTHER PUBLICATIONS

IBM, "Method to manage reservation and allocation of scarce resources shared by tenants in a massively multi-tenant environment," IPCOM000188508D, Oct. 12, 2009.

(Continued)

*Primary Examiner* — Robert B Harrell
(74) *Attorney, Agent, or Firm* — David B. Woycechowsky; David H. Judson; Jeffrey S. LaBaw

(57) ABSTRACT

Denial-of-service attacks are prevented or mitigated in a cloud compute environment, such as a multi-tenant, collaborative SaaS system. This is achieved by providing a mechanism by which characterization of "legitimate" behavior is defined for accessor classes, preferably along with actions to be taken in the event an accessor exceeds those limits. A set of accessor "usage profiles" are generated. Typically, a profile comprises information, such as a "request time window," one or more "constraints," and one or more "actions." A request time window defines a time period over which request usage is accumulated and over which constraints are applied. A constraint may be of various types (e.g., number of transactions, defined resource usage limits, etc.) to be applied for the usage monitoring An action defines how the system will respond if a particular constraint is triggered. By applying the constraints to accessor requests, over-utilization of compute resources is enabled.

7 Claims, 5 Drawing Sheets

(51) Int. Cl.
*G06F 17/30* (2006.01)
*G06F 9/50* (2006.01)

(52) U.S. Cl.
CPC ...... *H04L 63/1416* (2013.01); *H04L 63/1425* (2013.01); *H04L 2463/141* (2013.01)

(58) Field of Classification Search
CPC ............... H04L 63/145; H04L 63/1408; H04L 63/1416; H04L 63/1441; H04L 63/1458; H04L 63/1425; H04L 2463/141; G06F 9/505; G06F 17/30153
USPC ............................................ 709/229; 726/22
See application file for complete search history.

(56) References Cited

OTHER PUBLICATIONS

Anonymous, "Apparatus and Method of Tenant Context Generation and Propagation in SaaS Environment," IPCOM000198980D, Aug. 19, 2010.

Anonymous, "A method of providing SSO service between on-premise application and public cloud service," IPCOM000220208D, Jul. 25, 2012.

* cited by examiner

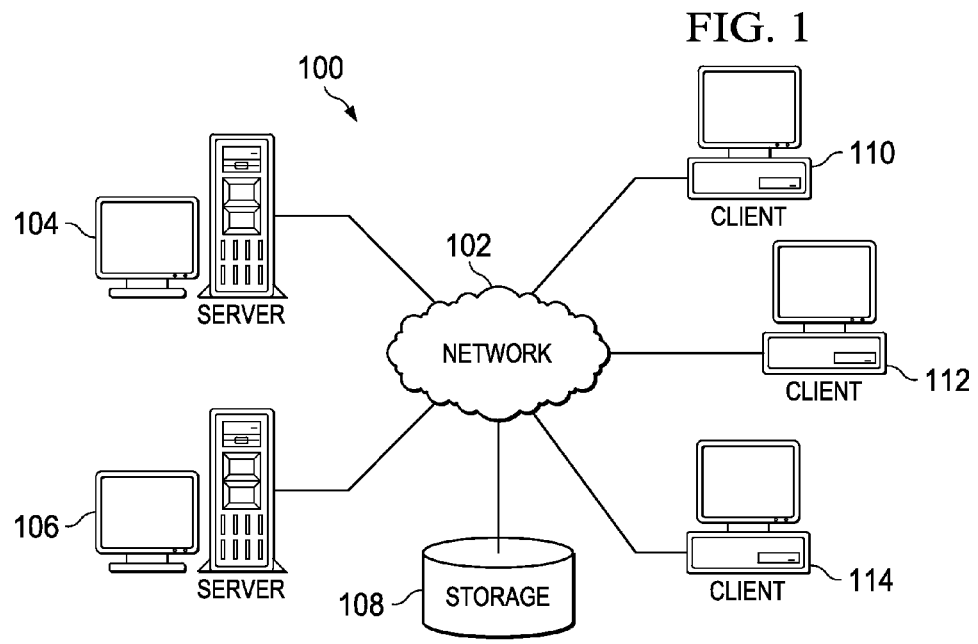
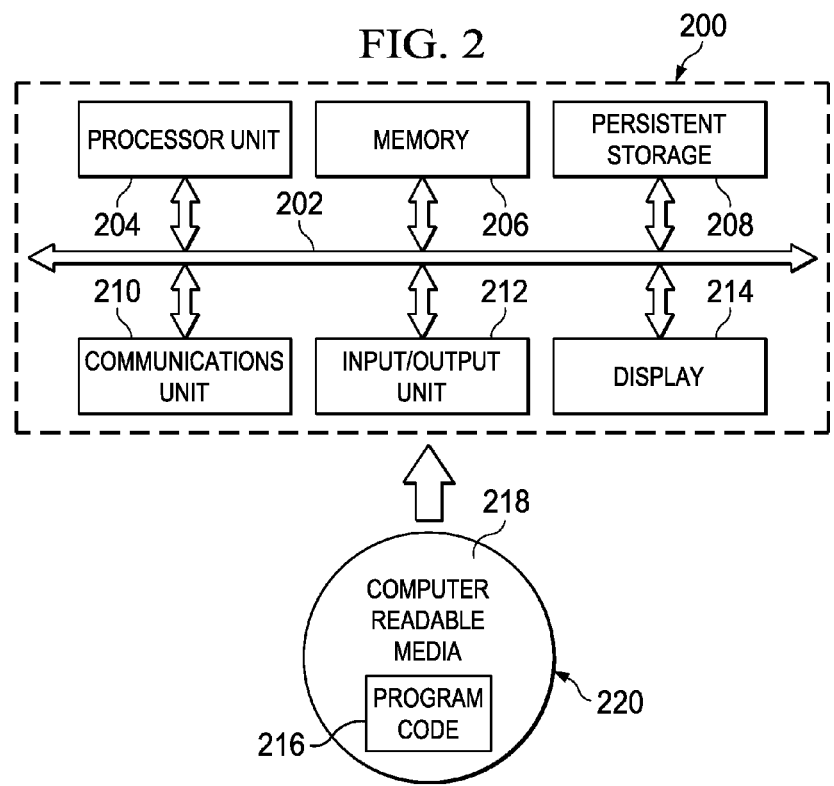

PREVENTING APPLICATION-LEVEL DENIAL-OF-SERVICE IN A MULTI-TENANT SYSTEM

BACKGROUND OF THE INVENTION

Technical Field

This disclosure relates generally to securing information in a cloud computing or other shared deployment environment wherein disparate parties share Information Technology (IT) resources.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. Cloud compute resources are typically housed in large server farms that run networked applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines. The different components may run on different subdomains in different physical cages in different data centers in different parts of the world, all running on different hardware with different proxy/gateway/session management capabilities and different back-end technologies.

Multiple entities (or "tenants") share the infrastructure. With this approach, a tenant's application instance is hosted and made available "as-a-service" from Internet-based resources that are accessible, e.g., through a conventional Web browser over HTTP. A cloud compute environment, such as IBM SmartCloud® for Social Business (formerly known as LotusLive®), presents to the user as a single unified experience; in operation, the end user logs-in once against a centralized authentication component, and then transparently signs-on (e.g., via SAML (Security Assertion Markup Language)-based authentication and authorization techniques) into different components of the service.

Multi-tenant, collaborative SaaS (Software-As-A-Service) systems such as IBM SmartCloud® for Social Business often provide a number of different interfaces for customers. These might include: proprietary protocol-based installed end-user applications, browser-based end-user applications, mobile device servers (e.g., IBM Lotus Traveler Server) within the SaaS environment, mobile device servers outside the SaaS environment and typically used for individual customers, commercial third party products used by customers to access the SaaS system and hosted by customers, and customer applications accessing the SaaS system. This large variety of "accessors" to the cloud infrastructure complicates the service provider's ability to track usage within its shared infrastructure. Indeed, even within the "known" applications provider by the SaaS provider, there may be many sub-modes of usage. For example, routine end-user access patterns might differ substantially from actions taken by those applications to synchronize or replicate data to enable off-line usage of the application. Also, bugs occurring (e.g., especially in server-based accessors) may result in unintentional denial-of-service attacks on cloud resources, thereby inhibiting or undermining legitimate utilization of cloud resources.

Another important consideration in such a shared multi-tenant environment is the consideration that some accessor patterns may be allowed only if an explicit commercial arrangement has been made with the cloud service provider (to use the applicable cloud resources). In the collaborative software market, there are thousands of third party add-on products that can be used with an application hosted in the cloud as-a-service. In some case companies moving to the SaaS model may require and be able to contract for the continuing use of those products; in many cases, those products may be providing a service for hundreds of thousands of downstream end-users, thereby requiring substantial resources from the SaaS vendor.

Although accessors in SaaS environments typically are known and registered entities (i.e., entities that have contracted for the service and whose identities are known to the service), quasi-anonymous access (e.g., self-service trials) may also allow usage by intentional abusers.

A denial-of-service attack in a shared tenant infrastructure such as described can have serious consequences. It may prevent legitimate users and usage of the service from continuing with acceptable response time and transaction throughput rates. Such attacks can lead to rejection of service for legitimate users and thereby create business-impacting support situations.

There remains a need in the art to provide denial-of-service attack prevention or mitigation in a shared, multi-tenant SaaS environment.

BRIEF SUMMARY

According to this disclosure, denial-of-service attacks are prevented or mitigated in a cloud compute environment, such as a multi-tenant, collaborative SaaS system. This goal is achieved by providing a mechanism by which a generalized characterization of "legitimate" behavior is defined for one or more (or an arbitrary) sets of accessor classes, preferably along with a set of actions to be taken in the event an accessor exceeds those limits. In a representative embodiment, a set of accessor "usage profiles" (or "profiles") are generated. Typically, a profile comprises a set of information, such as a "request time window," one or more "qualifications," one or more "constraints," and one or more "actions." A request time window defines a period of time over which request usage is accumulated and over which constraints are applied. A qualification defines a schedule, transaction type, accessor type or accessor identifier. A constraint may be of various types (e.g., number of transactions, average request frequency, concurrent request limit, CPU usage limit, transaction duration limit, disk I/O limits, disk byte limits, network I/O limits, etc.) that are to be applied for the usage monitoring An action defines how the system will respond if a particular constraint is triggered/fired. More than one profile may be applied to a given accessor or applied (for a particular accessor) over a given time interval.

Once the profiles are defined, a usage monitor then tracks usage against the profiles, and one or more actions as defined by the profiles are then taken as necessary (e.g., by the service provider, by the hosted applications themselves, or both) to address violation(s) of the defined constraints. In this manner, the cloud service provider allows for expected usage patterns, but it can readily detect and mitigate or even prevent aberrant usage. The mechanism also provides surveillance against misuses, whether or not intentional.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 1 depicts an exemplary block diagram of a distributed data processing environment in which exemplary aspects of the illustrative embodiments may be implemented;

FIG. 2 is an exemplary block diagram of a data processing system in which exemplary aspects of the illustrative embodiments may be implemented;

DETAILED DESCRIPTION OF AN ILLUSTRATIVE EMBODIMENT

Figure 3:
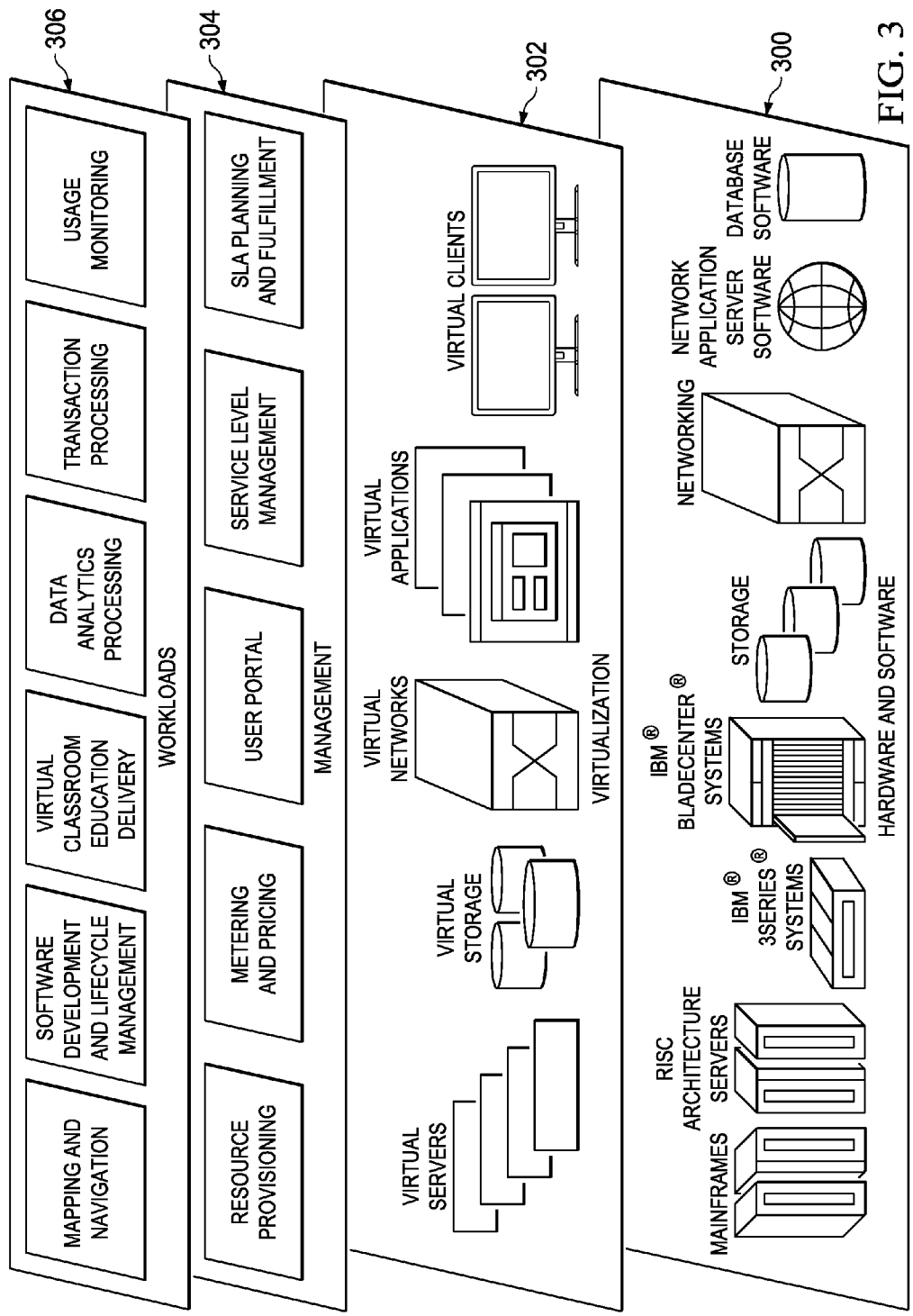
FIG. 3 illustrates an exemplary cloud computing architecture in which the disclosed subject matter may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the subject matter.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the disclosed subject matter may be written in any combination of one or more programming languages, including an object-oriented programming language such as Java™, Smalltalk, C++, C#, Objective-C, or the like, and conventional procedural programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided: Hardware and software layer 300 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to this disclosure, a denial-of-service attack prevention mechanism.

It is understood in advance that although this disclosure includes a detailed description on cloud computing, implementation of the teachings recited herein are not limited to a cloud computing environment. Rather, embodiments of the disclosed subject matter are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

By way of example only, a representative enterprise application deployed in the cloud is a client-server application such as IBM® SmartCloud® for Social Business (formerly LotusLive), which provides a cloud-delivered suite of technologies that combine web conferencing, messaging, and collaboration services with social networking capabilities in an easy-to-use web-based environment. As a component of IBM® SmartCloud, Notes® provides a full-featured email, calendaring, contact management, and instant messaging. A user can access the service directly over the Internet in a number of ways, such as using a web browser, or a "rich" client application (such as the Notes rich client). Using this service, an enterprise places in the cloud service its email, calendar and/or collaboration infrastructure, and a user uses the Notes client to access his or her email, perform a calendar operation, or facilitate an online collaboration. In a representative embodiment, the Notes rich client is Version 8.5.2 or higher.

The above example (using IBM SmartCloud) is merely representative. The techniques described below are not limited for use with a particular enterprise application deployed within the cloud environment.

Figure 4:
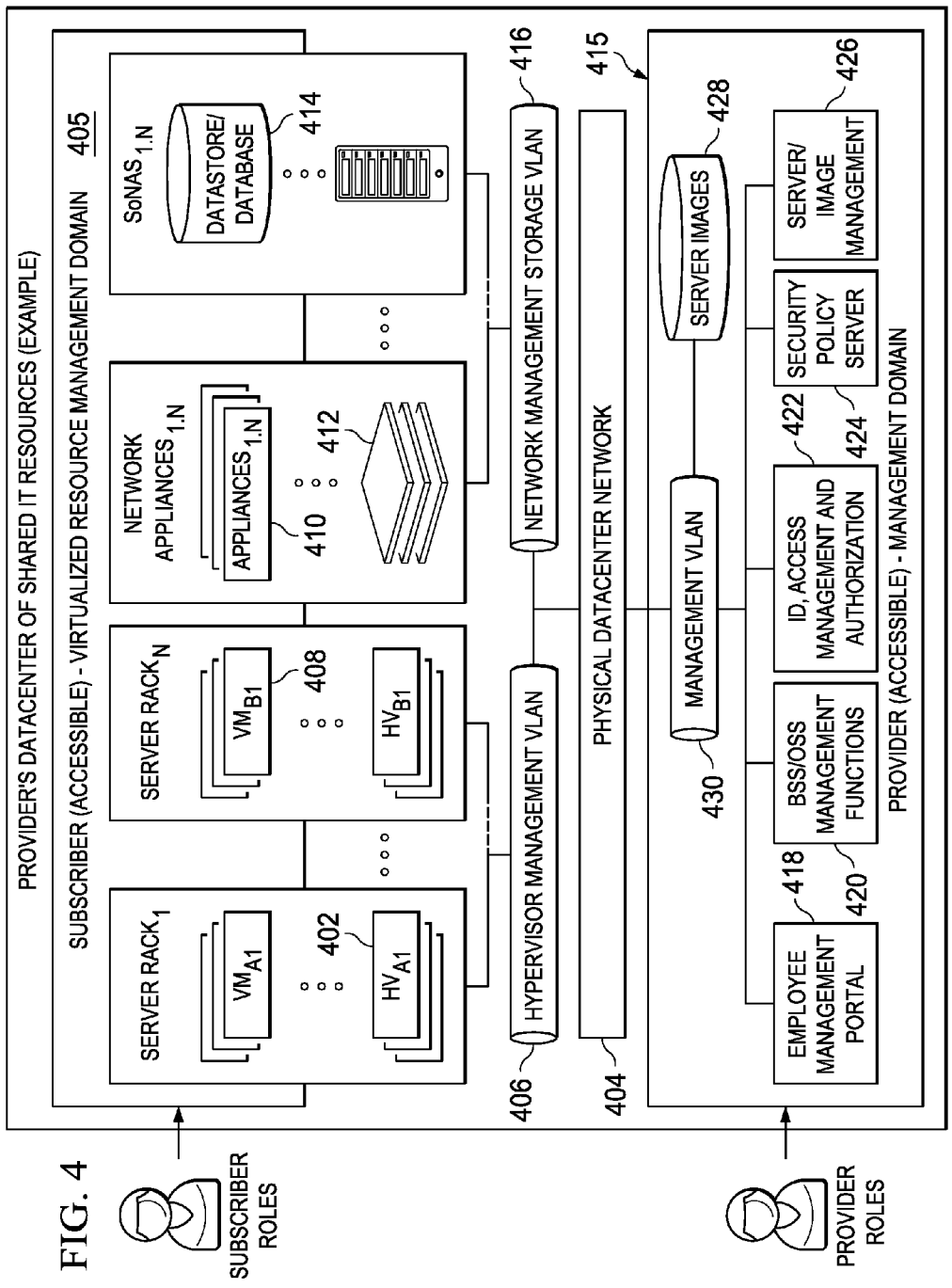
FIG. 4 illustrates an exemplary datacenter in which the denial-of-service attack prevention mechanism of this disclosure may be implemented.

FIG. 4 illustrates a typical IT infrastructure that supports virtualization of resources. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Multiple tenants share the infrastructure in a multi-tenant, collaborative SaaS system. An "accessor" is an entity (a cloud customer or prospect, an end-user of the cloud customer, or a third party entity or end-user) that desires access to use a cloud resource.

Preventing Application-Level Denial-Of-Service Attacks

Figure 5:
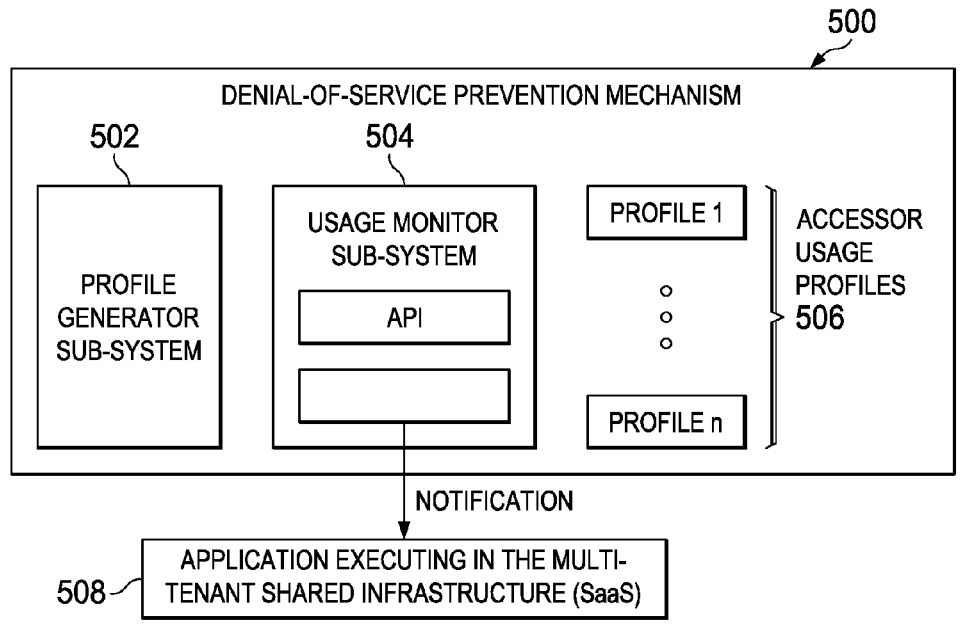
FIG. 5 illustrates a high-level block diagram of the basic components of the denial-of-service attack mechanism of this disclosure.

As illustrated in FIG. 5, the basic denial-of-service mechanism 500 of this disclosure includes two (2) primary sub-systems, a profile generator sub-system (or "profile generator") 502, and a usage monitor sub-system (or "usage monitor") 504. In general, the profile generator 502 is a tool by which a set of accessor usage profiles 506 are defined and stored for use by the usage monitor. The usage monitor 504 is the mechanism that receives the usage profiles and, as cloud resources are accessed and/or used, provides notifications (e.g., to the hosted applications, to management systems, or both) that one or more of the constraints defined therein are implicated. In one embodiment, as described in more detail below, the usage monitor 504 comprises a set of application programming interfaces (APIs) 510 that allow applications, such as application 508, to provide usage information and to respond with directions to the application about one or more actions to take in response to accessor requests. The applications typically represent the tenant applications being hosted in the cloud infrastructure, although this is not a limitation. When an application 508 receives a notification from the usage monitor that a constraint in a profile has been fired, the application can take a specified action, e.g., generate a warning, constrain access, restrict access, suspend the accessor, or the like. As multiple applications using the approach (in the aggregate) then operate concurrently (typically independently), the result is that no one accessor ends up obtaining access to sufficient cloud resources in such a manner that a denial-of-service can take place.

As used herein, a "denial-of-service" should be broadly construed to refer to any degradation of a tenant's service to a point below an acceptable response time and/or transaction throughput rate, whether or not the attack leads to a full rejection of service for legitimate users. A denial-of-service may occur deliberately, namely, as a result of an intentional act, or it may occur without direct intention on the part of the accessor(s) whose activity creates the situation.

Without limitation, the profile generator may be implemented as a web-based configuration tool and a set of back-end management processes. The functions in the profile generator 502 and usage monitor 504 sub-systems may be shared or common, local or remote, and accessible over a network, typically via a secure link. There may be one or more executing instances of the profile generator and the usage monitor depending on implementation and workload. When multiple instances are executed, additional hardware and software support (e.g., load balancing, name servers, back-end databases, etc.) may be used.

Figure 6:
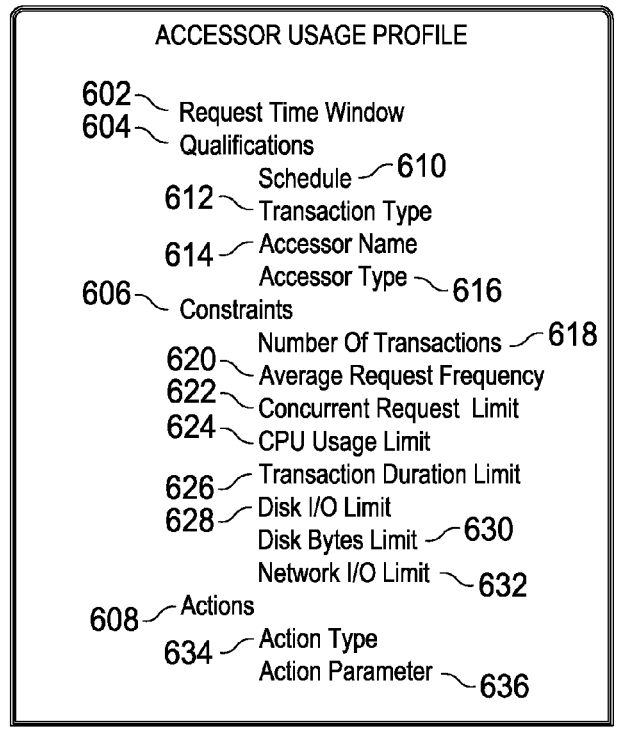
FIG. 6 illustrates a representative format of an accessor usage profile according to this disclosure.

The profiles provide a generalized characterization of legitimate behavior to be defined for each of an arbitrary set of accessor classes along with a set of actions to be taken in the event an accessor exceeds these limits. In one embodiment, the profiles are defined as a set of XML-encoded data sets contained in a text file. FIG. 6 illustrates a representative profile. A profile 600 typically comprises the following set of information, e.g., encoded as ASCII string values): a request time window 602, one or more qualifications 604, one or more constraints 606, and one or more actions 608. A request time window 602 is a period of time request usage is accumulated over to apply the one or more constraints defined in the profile. Typically, a request time window is a relatively small number of minutes to avoid excessive data accumulation, although there is no limit to the request time window. A qualification 604 may have one or more different attributes, such as schedule 610, transaction type 612, accessor name 614, and accessor type 616.

A schedule 610 constrains application of the profile to certain times of day, or to certain days, or the like. Typically, a schedule is composed of zero or more day/time windows of the form: start day/time and end day/time. If more than zero day/time windows are provided, the profile preferably is only enforced for the defined windows.

The transaction type 612 preferably is a list that includes all transactions by default. The list may include transactions defined, for example, by a set of internal transaction codes, by system-supplied codes, or by other identifiers. If a list is specified (e.g., by a set of internal transaction codes) and a given transaction is not contained in the list, preferably the profile is not applied to that transaction. The accessor name 614 preferably is a list of zero or more accessor names. If specified, preferably only transactions with matching accessors are considered. The accessor type 616 is a list of zero or more accessor types. If specified, preferably only transactions with matching accessor types are considered.

The one or more constraints 606 may be of several different types as well. The number of transactions 618 defines a maximum number of transactions permitted. If non-zero, preferably the constraint is triggered if more than this number of qualified transactions is attempted during the request time window 602. An average request frequency 620 preferably is measured by using a termination time of a previous transaction to a start time of a next transaction. This metric is used to prevent an accessor from gaining an advantage by submitting long-running transactions. Preferably, an average time is used in favor of an absolute inter-transaction time to prevent an accessor from using simple pauses to prevent constraint triggering. A concurrent request limit 622 defines how many concurrent requests a given accessor may have. A CPU usage limit constraint 624 defines a total CPU usage, preferably in milliseconds, that an accessor may utilize in the request time window. A transaction duration limit 626 defines a total request processing duration limit, preferably in milliseconds, across all requests in the request time window that an accessor is allowed. A disk I/O limit 628 defines a total number of disk I/O operations (e.g., reads and writes) across all requests in the request time window that an accessor is allowed. A disk bytes limit 630 defines a total number of disk bytes (read and written, preferably in KB) across all requests in the request time window that an accessor is allowed. A network I/O limit 632 defines a total number of network bytes, preferably in KB, sent and received across all requests in the request time window an accessor is allowed. These constraints are merely representative, and functions (e.g., Booloean or other operations) that combine one or more may be configured. In addition, while the one or more constraints preferably operate within the applicable request time window, one or more constraints may be tied to occurrence of a given additional condition or occurrence.

The one or more actions 608 may include action types 634, and action parameters 636. An action type 634 is an action to return if a constraint in the profile is triggered (fired). Preferably, the action is read from the profile and returned by default without interruption. An action parameter 636 (e.g., a number of seconds to delay for an accessor delay action type) is applied to an action type. Preferably, the action parameter is also returned from the profile without interruption.

Preferably, a user interface includes a configuration tool (e.g., a network-accessible set of pages) by which a permitted user configures a profile. There may be a set of default profiles for one or more use case scenarios, and a particular tenant may have access to different set(s) of profile templates depending, for example, on the customer's status (e.g., gold, silver or bronze level). Certain fields in a profile template may be masked or inaccessible for certain types of customers. Thus, there may be different profile templates that are accessible for different users, such as tenants, tenant prospects, other third parties, and the like. A profile may be static or dynamic, and it may be pre-configured or configured manually, automatically or programmatically.

Figure 7:
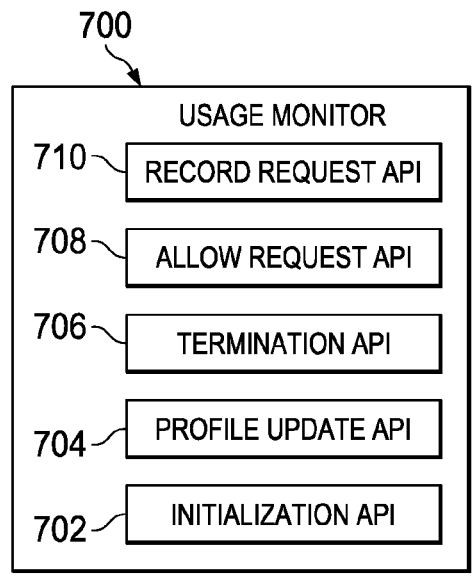
FIG. 7 illustrates a block diagram of a usage monitor sub-system according to this disclosure.

FIG. 7 illustrates a representative usage monitor 700. Preferably, the usage monitor provides a set of APIs that include the following: initialization 702, profile update 704, termination 706, allow request 708, and record request 710. The initialization API 702 causes the usage monitor to be initialized. Upon initialization, preferably the usage monitor reads all profiles that have been configured and/or are retrieved to the usage monitor. The update profile API 704 causes all profiles to be re-read and to become current. The termination API 706 terminates the usage monitor. The allow request API 708 receives as inputs one or more of the following: accessor name 614, accessor type 616 and transaction type 612; preferably, the allow request API 708 returns the corresponding action type 634 and action parameter 636. Preferably, and as will be described in more detail below, the allow request API 708 is called before every accessor request is processed. During this processing, the usage monitor checks the applicable constraints for the profile at issue and, if any constraint fires, the API returns the corresponding action type and action parameter to allow the calling application to respond as it determines is appropriate (or as the system may pre-configure or predetermine). The record request API 710 receives as inputs one or more of the following: accessor name 614, accessor type 616, transaction type 612, a duration in milliseconds (representing the transaction duration), CPU milliseconds (representing CPU usage consumed during the transaction), disk I/Os (representing disk I/Os occurring during the transaction), disk bytes (representing disk bytes consumed during the transaction), and network bytes (representing network I/O consumed during the transaction). Preferably, the record request API 710 is called after every accessor request completes. This API should be called if the allow request API was called previously for the same request.

The profile and usage monitor framework is not limited to enforcing a single fixed profile per accessor. As noted above, a given profile may differ from another profile with respect to one or more of the following: request time window, qualification(s), constraint(s), or action(s). Further, more than one profile may be applied to a given accessor and/or applied to an accessor for a given time interval. For example, there may be different levels of constraints applied for shorter durations (e.g., a few seconds) versus longer durations (e.g., an hour) Or, different actions may be applied to different limits. If a constraint in more than one profile fires for an accessor, the action type (and corresponding action parameter, if any) returned preferably is a highest one (in an ASCII sort order for example). This type of flexibility enables applications that use the usage monitor (and its APIs) a simple and effective way to create levels of action types without the usage monitor having to interpret/manage them.

The usage monitor (or an instance thereof) may be implemented in software (as a computer program) executing in a hardware processor. One or more data structures associated therewith store the profiles or data therein. A database may be used to store profile data in any convenient manner. In one embodiment, the profile data and the profiles are stored in a hash table that is keyed by an accessor identifier (e.g., accessor name/accessor type) with zero or one entry per key. A linked list (with a first entry being the oldest) may then be associated with each accessor entry in the hash table, with one for every request that has been processed by the accessor within the request time window whether complete or still being processed. The hash table may be periodically updated (e.g., by a background daemon) to remove accessors from the table, to thereby maintain the size of the table manageable for use in a working memory.

Preferably, the one or more action(s) performed when a constraint is fired will depend on the application. This is a not a limitation, as there may be a pre-configured or pre-defined set (or sequence) of actions that are system-imposed. The service provider may provide the tenant with a set of default action(s) or action sequences, or certain action(s) or action sequences may be imposed on the consuming application(s) by default, manually, automatically or programmatically. Typically, an application has a defined set of one or more actions. The actions may be implemented all at once, or in some predefined or configurable sequence. One such sequence that may be implemented by a consuming application may be as follows: generating a warning email to the accessor, generating a warning email to a defined tenant administrator, delaying access in real-time to some cloud resource (with optional delay interval returned), return a failure to the accessor, temporarily suspend accessor (with optional suspend interval returned), and permanently suspending accessor (subject to manual reinstatement). Of course, other sequences (or no sequence) may be configured and instantiated. The particular sequence may also be specified in the profile.

The mechanism of this disclosure may be implemented with respect to a single hosted application, or across multiple such applications (operating within the cloud environment concurrently). Typically, at least first and second tenants will use different profiles (because the end user use requirements are likely to differ).

Figure 8:
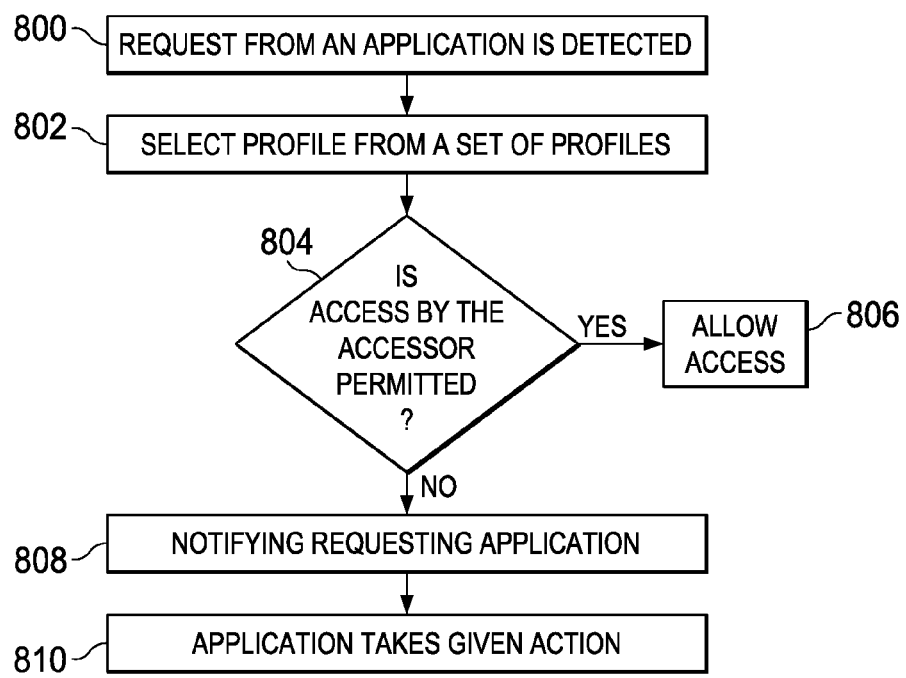
FIG. 8 illustrates a process flow of the usage monitor sub-system in FIG. 6 in a representative embodiment.

FIG. 8 illustrates a representative process flow for the usage monitor. As noted above, typically there will be multiple instances of the usage monitor, perhaps one per hosted application. The process assumes that profiles are defined and the usage monitor initialization API has been called. At step 800, a request for the application is detected. The request includes an identifier associated with a requesting user. Based on the request type or the identifier, and preferably before the request is processed in the cloud system, a profile of the set of profiles is selected at step 802. As noted above, the profile defines an allowed amount of access over a given time period (the request time window), typically for a given transaction type. What constitutes an allowed "amount of access" typically will vary for each profile, and it is defined by the particular constraint or constraints set forth in the applicable profile. At step 804, a test is performed to determine whether the accessor is permitted to access the application (e.g., based on the one or more constraints in the selected profile, a recent user history for the accesssor, etc.). If the outcome of the test at step 804 indicates that the user should be permitted access (because some constraint in the profile is not yet triggered), the routine continues at step 806 to allow the request. As described above, the constraint may be of various types including, without limitation, number of transactions, average request frequency, concurrent requests, transaction duration, etc. If, however, the outcome of the test at step 804 is negative, the requesting application is notified at step 808, using the action data specified in the profile. At step 810, the application takes a given action based on the action data returned, and the process terminates with respect to the request. As noted above, in one embodiment, the action taken by the application may be issuing an escalating set of warnings that a usage is approaching a usage threshold in the profile.

The approach herein is quite flexible and may have numerous variants. Thus, for example, the decision regarding which particular profile to select from the set of profiles may depend on an identity or, or some other characteristic associated with, the particular tenant, or a determination of which tenant a particular accessor is associated. The approach also preferably includes a configuration management sub-system (or leverages an existing one in the cloud infrastructure) to add new profile(s) or to add new types of profile constraints as different or new types of applications or accessors start to use the infrastructure. The management sub-system may also provide for the specification and enforcement of actions to prevent or mitigation resource over-utilization other than just providing an escalating set of actions (such as described above). Other actions may include, without limitation, pushing requests into a waiting queue before allowing access, restricting a number of self-service trials, restricting access from a given number of indirect users (i.e., those that third parties who use products through the hosted application), and the like The profile generation and usage monitoring functions be part of an existing cloud management functionality (e.g., BSS, OSS, or other directory service), or they may be an extension or adjunct to some other cloud function, operation or mechanism. In operation, when the denial-of-service attack mechanism receives an indication that accessor user is attempting to take an action at a first cloud service despite the firing of an applicable profile constraint, the mechanism notifies the consuming application to take one or more actions, or one or more actions may be taken by the service itself.

The techniques described herein provide significant advantages over the prior art by preventing application-level denial-of-service attacks in a multi-tenant collaborative SaaS system. Using the approach, legitimate users and usage of the service may continue with acceptable response time and transaction throughput rates. The approach further ensures that denial-of-service attacks do not lead to rejection of service for legitimate users or otherwise create business-impacting support situations. The techniques enable detection and prevention of abusive usage of cloud resources, as well as prevention of subsequent denial-of-service attempts by intentional abusers. The mechanism is dynamic and can readily adapt to new behaviors (both good and bad), and it is flexible and thus able to allow for new, specifically allowable use cases (e.g., when an application in the SaaS business decides to allow certain behavior). In summary, the approach herein thus provides a general service to allow applications to avoid abuse of their service in the context of a collaborative, multi-tenant SaaS system.

One or more aspects of the described functionality described above may be implemented as a standalone approach, e.g., a software-based function executed by a processor, although the preferred implementation is as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the inactivity tracking and management functionality is implemented in software, which includes but is not limited to firmware, resident software, microcode, and the like. Furthermore, denial-of-service mechanism and/or particular functions therein can take the form of a computer program product accessible from a computer-usable or computer-readable non-transitory medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Storage devices may include removable media, such as SD cards. The computer-readable medium is a tangible, non-transitory item. Any of these devices can be used to store the authentication or other status information described above.

Any cloud datacenter resource may host denial-of-service mechanism or its components as described herein.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the denial-of-service mechanism is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the usage tracking and denial-of-service functionality provided herein may be implemented as an adjunct or extension to an existing cloud compute management solution.

The techniques described herein may be used in any virtual client-server environments.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method of improving an operation of a multi-tenant shared computing infrastructure by preventing or mitigating application-level denial-of-service with respect to compute resources in the multi-tenant shared computing infrastructure, wherein a set of tenant applications available in the multi-tenant shared computing infrastructure are accessible by one or more accessors that are permitted access, the method comprising:

providing a set of accessor usage profiles, at least one accessor usage profile representing legitimate behavior in the multi-tenant shared computing infrastructure by defining a time period, at least one usage constraint, and an accessor type;

upon receipt from an accessor of a request to access a given application in the multi-tenant shared computing infrastructure, selecting a given usage profile from the set of usage profiles;

upon matching the accessor type, applying the at least usage constraint in the selected accessor usage profile with respect to the defined time period to determine whether the request to access the given application should proceed;

when permitting the request to access triggers the at least one usage constraint in the selected accessor usage profile with respect to the defined time period, providing the given application a notification.

2. The method as described in claim 1 wherein the notification includes data specifying an action, the action defined in the at least one accessor usage profile.

3. The method as described in claim 2 wherein the action is enforced by the given application.

4. The method as described in claim 2 wherein the action is an escalating set of actions.

5. The method as described in claim 1 wherein the accessor usage profile also includes a qualifier.

6. The method as described in claim 5 wherein the qualifier is one of: a schedule, a transaction type, an accessor type, and an accessor name.

7. The method as described in claim 1 wherein the at least one usage constraint is one of: a number of transactions attempted during the time period, an average request frequency during the time period, a number of concurrent requests permitted by the accessor during the time period, a total transaction duration permitted by the accessor during the time period, and a total resource usage permitted by the accessor during the time period.

* * * * *